(12) United States Patent
Verma

(10) Patent No.: US 11,734,056 B1
(45) Date of Patent: Aug. 22, 2023

(54) DECLARATIVE CODE PLAYER EXECUTION OF A PROCESSING WIDGET

(71) Applicant: INTUIT INC., Mountain View, CA (US)

(72) Inventor: Manish Verma, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 17/877,574

(22) Filed: Jul. 29, 2022

(51) Int. Cl.
*G06F 9/48* (2006.01)
*G06F 8/65* (2018.01)
*G06F 9/38* (2018.01)

(52) U.S. Cl.
CPC ............... *G06F 9/485* (2013.01); *G06F 8/65* (2013.01); *G06F 9/3836* (2013.01)

(58) Field of Classification Search
CPC ........... G06F 9/485; G06F 8/65; G06F 9/3836
See application file for complete search history.

(56) References Cited

U.S. PATENT DOCUMENTS

| | | | | |
|---|---|---|---|---|
| 5,560,010 A * | 9/1996 | Albert | ................... | G06F 9/4488 717/108 |
| 11,327,798 B1 * | 5/2022 | Cotirlea | ................ | G06F 9/5011 |
| 2003/0041131 A1 * | 2/2003 | Westerinen | ......... | G06F 16/9024 709/221 |
| 2007/0094110 A1 * | 4/2007 | McCrea | ................. | G06Q 30/04 705/32 |
| 2009/0319979 A1 * | 12/2009 | Mondal | ................... | G06F 9/541 717/100 |
| 2011/0143663 A1 * | 6/2011 | Renard | ............ | G06Q 20/38215 455/41.1 |
| 2014/0137005 A1 * | 5/2014 | Park | .................... | G06F 3/04842 715/760 |
| 2014/0297405 A1 * | 10/2014 | Fine | .................... | G06F 11/3428 705/14.53 |
| 2017/0364678 A1 * | 12/2017 | Mertoguno | ............. | G06F 21/55 |
| 2019/0208031 A1 * | 7/2019 | Bennet | .................. | H04L 67/141 |

* cited by examiner

*Primary Examiner* — Jorge A Chu Joy-Davila
(74) *Attorney, Agent, or Firm* — Ferguson Braswell Fraser Kubasta PC

(57) ABSTRACT

A method includes obtaining, by a computing system executing a declarative code player, a processing widget defining multiple states and executing, by the computing system executing the declarative code player, the processing widget. Executing the processing widget comprises, for each current state of at least a subset of the states obtaining multiple state lifecycle declaration for the current state from a repository, the state lifecycle declaration is specified as declarative content, executing multiple library instructions according to the state lifecycle declaration to perform at least one operation of the current state, and transitioning, as defined by the current state, to a next state as defined in the processing widget.

17 Claims, 28 Drawing Sheets

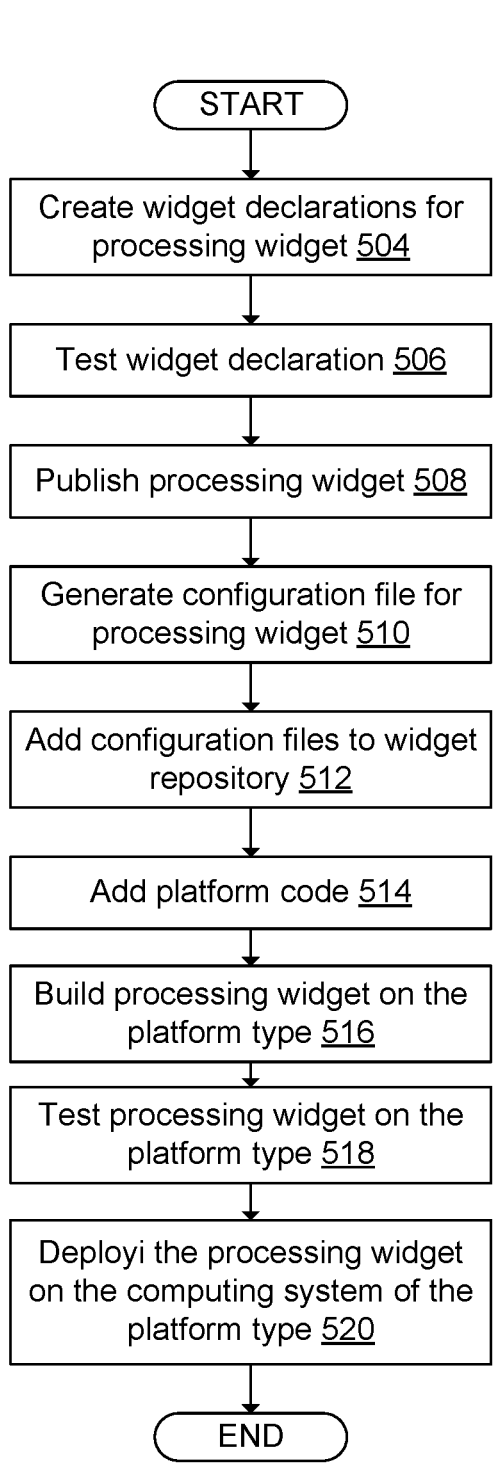
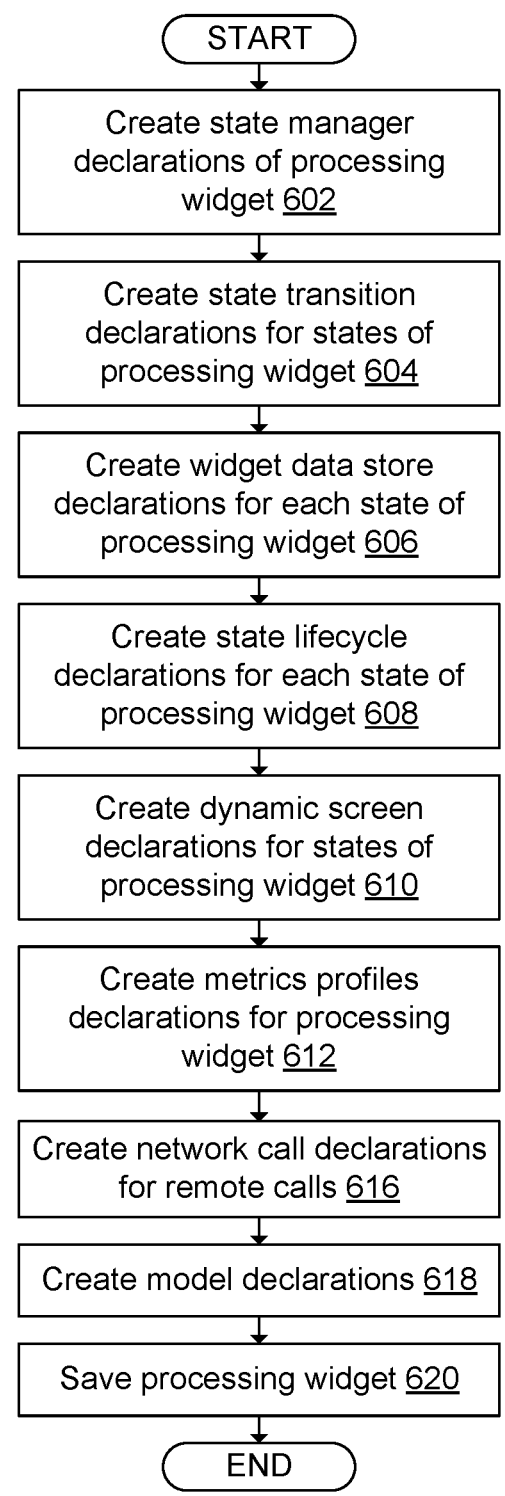
FIG. 5
FIG. 6A

```
                                        ┌─ 1006
                                        │
                              ┌─────────────────────────────┐
                              │          Models             │
                              ├─────────────────────────────┤
                              │ : [                         │
                              │                             │
                              │ "Identifier": "ChannelsRequestPayloadDef",
                              │ "type": "reflection",       │
                              │ "reflection": {             │
                              │   "packageName": "com.intuit.ifc.spout:",
                              │   "className": "ChannelsRequestPayload"
                              │                             │
                              │ "Identifier": "ChannelsResponsePayloadDef",
                              │ "type": "reflection",       │
                              │ "reflection": {             │
                              │   "packageName": "com.intuit.ifc.spout:",
                              │   "className": "ChannelsResponsePayload"
                              └─────────────────────────────┘

┌─ 1004
            │
  ┌─────────────────────────────┐
  │        Network Call         │
  ├─────────────────────────────┤
  │ "callTag": "AVAILABLE_CHANNELS",
  │ "methodType": "POST",
  │ "urls": {
  │   "prodUrl": "https://spout.api.intuit.com"
  │   "preProdUrl": "https://spout-e2e.api.intu
  │ },
  │ "endPoint": "/v1/flowable/channels",
  │ "requestPayloadDef": "ChannelsRequestPayload
  │ "responseTypeDef": "ChannelsResponsePayloadD
  │ "considerEmptyResponseAsError": true
  │ },
  │ {
  │ "callTag": "CONNECTION_TIME_SLOTS",
  │ "methodType": "GET",
  │ "urls": {
  │   "prodUrl": "https://channelfloworchestrato
  │   "preProdUrl": "https://channelfloworchestr
  │ },
  │ "endPoint": "/v1/connection/time-slots",
  │ "queryParamDef": "GetConnectionSlotsQueryPar
  │ "responseTypeDef": "GetConnectionSlotsRespon
  │ "considerEmptyResponseAsError": true
  │ },]
  └─────────────────────────────┘

┌─ 1002
│
┌─────────────────────────────┐
│          Screens            │
├─────────────────────────────┤
│ "screenDetails": {
│   "id": "channel-selection-error-screen"
│ },
│ "screenElements": [
│ {
│   "id": "group-error-screen-info",
│   "type": "groupElements",
│   "anchor": {
│     "position": "center",
│     "relativeTo": "parent"
│   },
│   "groupElements": [
│     {
│       "id": "error-screen-title",
│       "type": "titleText",
│       "onText": "Something went wrong !"
│     },
│     {
│       "id": "error-screen-sub-title",
│       "type": "subText",
│       "displayBindingKey": "channel-selection-error
│     }
│   ]
│ },
│ {
│   "id": "error-screen-retry-button",
│   "type": "button",
│   "displayBindingKey": "error-screen-retry-button"
│   "actionBindingKey": "error-screen-retry-button",
│   "anchor": {
│     "position": "bottom",
│     "relativeTo": "parent"
│   }
│ }
│ ]
└─────────────────────────────┘
```

FIG. 10

Transitions

| From | On Event | To |
|---|---|---|
| ChannelSelectionState | createSchedule | CreateScheduleState |
| ChannelSelectionState | hasUpcomingSchedule | ScheduleConfirmationState |
| ChannelSelectionState | onMissingDataError, onResponseTypeCastError, noChannelsAvailableError, noOpenChannelsAvailableError, channelsCallNetworkServiceError | ChannelSelectionErrorState |

*FIG. 12*

| Interaction Name | Degraded | Status |
|---|---|---|
| Interaction.ContactUsWidget.Started | | STARTED |
| Interaction.ChannelSelction.STARTED | | |
| Interaction.ChannelSelction.FAILED | true | FAILED |
| Interaction.ContactUsWidget.ENDED | | ENDED |

WidgetDefinition 1502 :
--------------------------------------------------------------------------------
WidgetDefinition → widgetName | widgetId | widgetAssetAlias | widgetVersion | enableMultiRouting | stateManagerDef | transitionDefs | networkCallDefs | modelDefs | metricProfileDefs widgetName → String
widgetId → String
widgetAssetAlias → String
widgetVersion → String
enableMultiRouting → bool

*FIG. 15A*

State Manager 1504:

---------------------------------------------------------------------------------------- stateManagerDef → name | states | startEvents | endStates | forcedEndStateName stateManagerDef.name → StateManagerIdentifier
stateManagerDef.states → [StateDef]
stateManagerDef.startEvents → [StartEventAndState]
stateManagerDef.endStates → [StateIdentifier]
stateManagerDef.forcedEndStateName → StateIdentifier StateManagerIdentifier → String
StateIdentifier → String
EventIdentifier → String StartEventAndState → EventIdentifier | StateIdentifier

*FIG. 15B*

State 1506:
--------------------------------------------------------------------------------
StateDef → name | hasUserInterface | hasBackEvent | stateLifeCycleDecls StateDef.name → StateIdentifier
StateDef.hasUserInterface → boolean
StateDef.hasBackEvent → BackEventType
StateDef.stateLifeCycleDecls → stateLifeCycleDeclarationFileNameWithPath stateLifeCycleDeclarationFileNameWithPath → String
BackEventType → no | yes | dynamic

*FIG. 15C*

State Life Cycle 1508:

---

StateLifeCycleOperations → name | initState | enterStateOnEvent | exitStateOnEvent | deInitState StateLifeCycleOperations.name → StateIdentifier
initState → [StateLifeCycleOperation]
enterStateOnEvent → [StateLifeCycleOperation]
exitStateOnEvent → [StateLifeCycleOperation]
deInitState → [StateLifeCycleOperation]

StateLifeCycleOperation → operationType | initializeViewModel | initializeDataBinder | initializeScreen | sendLog | sendBeacon | sendCustomeraInteraction | telemetry initializeViewModel → identifier | packageName | className
initializeViewModel.identifier → String
initializeViewModel.packageName → String
initializeViewModel.className → String initializeDataBinder → identifier | packageName | className
initializeDataBinder.identifier → String
initializeDataBinder.packageName → String
initializeDataBinder.className → String initializeScreen → identifier | uiType | screenDefinitionIdentifier | codeUiGenerator initializeScreen.identifier → String
initializeScreen.uiType → fromCode | fuegoJsonPlayer
initializeScreen.screenDefinitionIdentifier → String fromCode → "fromCode"
fuegoJsonPlayer → "fuegoJsonPlayer"
codeUiGenerator → identifier | packageName | className
codeUiGenerator.identifier → String
codeUiGenerator.packageName → String
codeUiGenerator.className → String

*FIG. 15D*

Transitions 1510:

------------------------------------------------------------------------------------ transitionDefs → [transitions]
transitions → from | onEvent | to | telemetry
from → StateIdentifier
to → StateIdentifier
onEvent → EventIdentifier

*FIG. 15E*

Network Calls 1512:

--- networkCallDefs → [networkCalls]

networkCalls → callTag | callType | methodType | urls | endPoint | requestPayloadDef | queryParamDef | responseTypeDef | considerEmptyResponseAsError | timeOut networkCalls.callTag → String
networkCalls.callType → rest | graphql | ws
methodType → post | get | delete | update | patch
urls → prodUrl | preProdUrl | qaUrl | perfUrl | mockUrl
endPoint → String
requestPayloadDef → modelIdentifier
queryParamDef → modelIdentifier
responseTypeDef → modelIdentifier
considerEmptyResponseAsError → boolean
timeOut → integer prodUrl → urlPath
preProdUrl → urlPath
qaUrl → urlPath
perfUrl → urlPath
mockUrl → urlPath urlPath → String
modelIdentifier → String

*FIG. 15F*

Model Definitions 1522:

--- modelDefs → [modelDef]

modelDef → identifier | type | reflection | declaration
modelDef.identifier → modelIdentifier
modelDef.type → "reflection" | "declaration"

reflection → identifier | packageName | className
reflection.identifier → String
reflection.packageName → String
reflection.className → String declaration → members
members → [member]

member → name | type | defaultValue | canBeNull | isMutable
member.name → String
member.type → "string" | "boolean" | "int" | "double" | "listOf.type" | "mapOf.keyType.valueType"

*FIG. 15G*

Metrics Profile Definitions 1524:
------------------------------------------------------------------------------------ metricProfileDefs → loggingDefs | customerInterctionDefs | analyticsDefs loggingDefs → [logDef]
logDef → logIdentifier | tag | message | additionalInfoIdentifier
logIdentifier → String
tag → String
message → String decWidInterface.getLogger.log("logIdentifier")

customerInterctionDefs → [interactionLog]
interactionLog → interactionIdentifier | interactionName | started | ended
interactionIdentifier → String
interactionName → String
started → additionalInfoIdentifier
ended → status | degraded | additionalInfoIdentifier analyticsDefs → [analyticsDef]
analyticsDef → analyticsIdentifier | ?????

additionalInfoIdentifier → String telemetry → logIdentifier | interactionIdentifier | analyticsIdentifier

| Error Model |
|---|
| NO_NETWORK |
| AUTH_ERROR |
| SERVICE_ERROR |
| NETWORK_ERROR |
| CLIENT_ERROR |
| TIMEOUT_ERROR |
| DATA_NULL |
| EMPTY_RESPONSE |
| RESPONSE_PARSE_ERROR |
| MALFORMED_REQUEST_ERROR |

2102

| Additional Info | Description |
|---|---|
| AppName | |
| WidgetId | |
| WidgetVersion | |
| NetworkCall | TAG |
| ErrorType | |
| Latency | Service SLA |
| StatusCode | HTTP Status |
| ErrorCode | Service error code |
| isRecoverable | Can UI recover from error |
| request_tid | |
| response_tid | |
| widgetFlowId | Unique per widget instance |

2104

| | |
|---|---|
| SUCCESS | <TAG>_SUCCESS_200 |
| ERROR | <TAG>_<ERROR_TYPE>_<HTTP_STATUS>_<SERVICE_ERROR_CODE> |

*FIG. 21*

DECLARATIVE CODE PLAYER EXECUTION OF A PROCESSING WIDGET

BACKGROUND

Currently, a great variety of computing device platforms exists. Generally, each type of computing device platform includes platform-specific hardware with varied capabilities, as well as an optional operating system environment in which computer applications may function. A computer application is often designed to work within the construct of an operating system and to work with the operating system to take advantage of at least some aspects of the platform hardware. To this end, computer applications must often be re-designed, at least in part, to be able to function as desired with each of the various operating systems and the platform hardware combinations. In such scenarios, each version of a computer application may require maintaining a separate application code base and separate accompanying programming effort for each environment in which a software vendor wants a computer application to function. A software vendor creates an application code, which may be translated to binary code or object code and deployed to a target platform. The code itself is a set of instructions that are executed on a target platform. When updates are made, the code is retested and redeployed to the target application. A problem exists in cross platform development when a software is to be executed on multiple platforms of varying platform types.

SUMMARY

In general, in one aspect, one or more embodiments relate to a method that includes obtaining, by a computing system executing a declarative code player, a processing widget defining multiple states and executing, by the computing system executing the declarative code player, the processing widget. Executing the processing widget comprises, for each current state of at least a subset of the states obtaining multiple state lifecycle declaration for the current state from a repository, the state lifecycle declaration is specified as declarative content, executing multiple library instructions according to the state lifecycle declaration to perform at least one operation of the current state, and transitioning, as defined by the current state, to a next state as defined in the processing widget.

In general, in one aspect, one or more embodiments relate to a system that includes a repository storing a processing widget defining multiple states, and a computer processor executing a declarative code player, the declarative code player executing a processing widget. Executing the processing widget comprises, for each current state of at least a subset of the states obtaining multiple state lifecycle declaration for the current state from a repository, the state lifecycle declaration is specified as declarative content, executing multiple library instructions according to the state lifecycle declaration to perform at least one operation of the current state, and transitioning, as defined by the current state, to a next state as defined in the processing widget.

In general, in one aspect, one or more embodiments relate to a method that includes presenting, in a graphical user interface, a graph interface to graphically define multiple states of a processing widget, and receiving, in the graph interface, multiple nodes connected by multiple edges. Each node of the multiple nodes corresponds to a state of the states. The method further includes receiving, in the graphical user interface, a state lifecycle declaration for the state and a state transition definition for connecting the state to a subsequent state. The state lifecycle declaration defines an operation of the current state and deploying the processing widget with a declarative code player. The declarative code player executes multiple library instructions through the states.

Other aspects of the invention will be apparent from the following description and the appended claims.

BRIEF DESCRIPTION OF DRAWINGS

FIG. 5 shows flowcharts in accordance with one or more embodiments.

FIGS. 6A and 6B show an example in accordance with one or more embodiments.

FIGS. 9, 10, 11, 12, 13, and 14 show examples in accordance with one or more embodiments.

FIGS. 15A, 15B, 15C, 15D, 15E, 15F, 15G, and 15H show example grammar in accordance with one or more embodiments.

FIGS. 16, 17, 18, 19, 20, and 21 show examples in accordance with one or more embodiments.

Like elements in the various figures are denoted by like reference numerals for consistency.

DETAILED DESCRIPTION

In general, embodiments are directed to a framework for deploying software on multiple platforms having heterogeneous platform types. The framework includes a declarative code player with code that is specific to each platform type, and generic to the different sets of operations that are to be performed. Specifically, the declarative code player is generic to the different operations that are performed. The declarative code player is connected to various library instructions that generically define operations.

The framework also includes a processing widget that is generic to the various platform types and specific to the operations that are performed. Generally, a processing widget is a small software component that is configured to perform a discrete task. In the present application, the processing widget is defined as a set of declarations rather than executable code. Each declaration is definitional data rather than an executable instruction. In particular, declarations, including for operations, are defined as attribute value pairs. The processing widget, thus, defines a set of operations and the parameters of the operations in a user simplified format.

Figure 1:
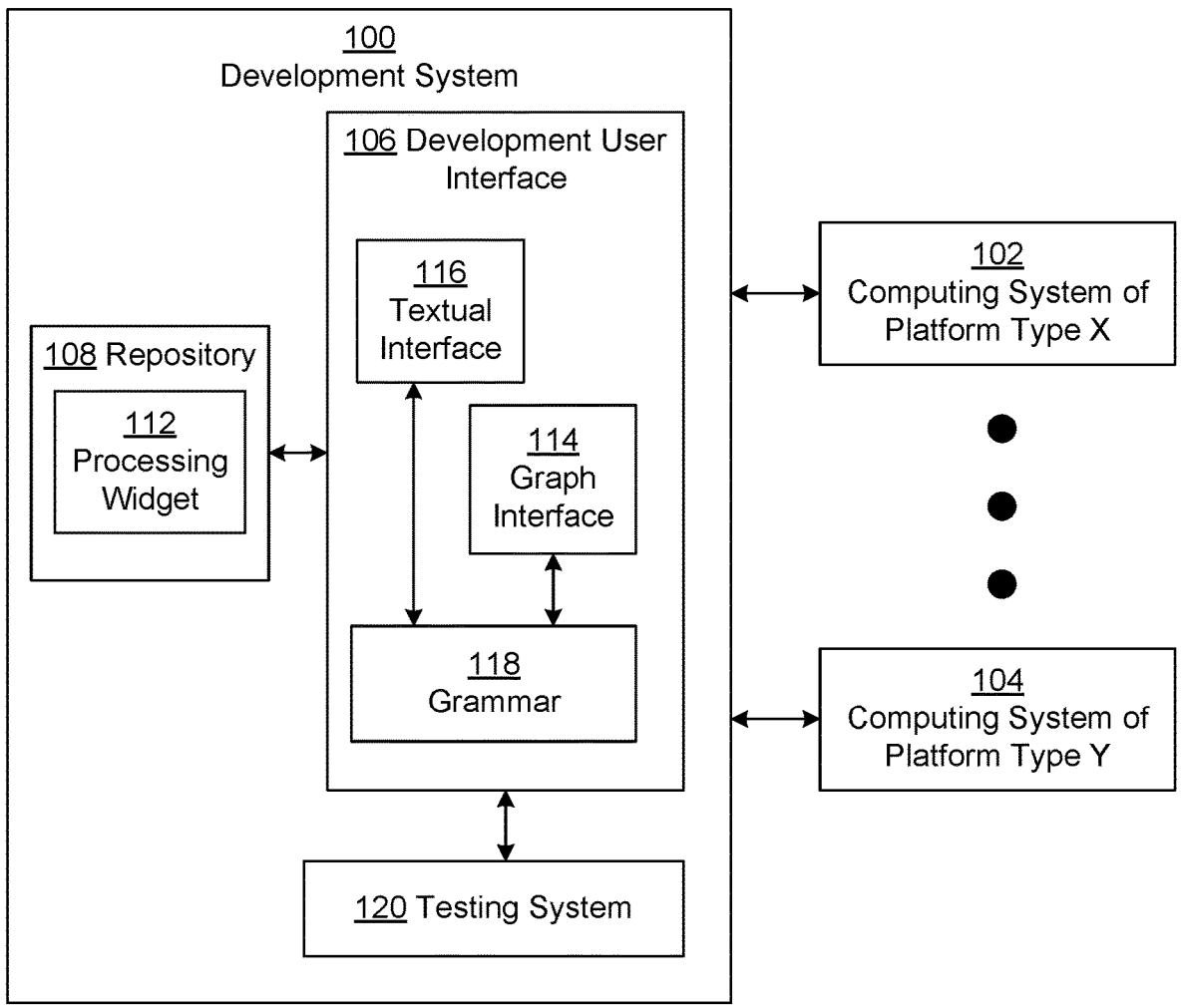
FIG. 1 shows a schematic diagram of a system in accordance with one or more embodiments.

Turning to the Figures, FIG. 1 shows a schematic diagram of a development system (100) in accordance with one or more embodiments. The development system (100) is communicatively, directly or indirectly, connected to multiple computing systems of varying platform types (e.g., computing system of platform type x (102), computing system of platform type y (104)). Each of the development system and computing systems may be the computing system described in FIGS. 22A and 22B and below.

Continuing with FIG. 1, a platform is the execution environment of the processing widget. The platform has a particular platform type. The heterogeneity or variability of the platform type includes heterogeneity in the operating system (e.g., different operating system versions, different operating system vendors), type of computing system (e.g., hardware including processor and memory), device type (e.g., tablet, laptop or desktop computer, phone, etc.), and software services executing on the computing system.

The development system (100) includes a development user interface (106) connected to a repository (108). The repository (108) is any type of storage unit and/or device (e.g., a file system, database, data structure, or any other storage mechanism) for storing data. The repository (108) includes functionality to store a processing widget (110). A processing widget (112) is the specification of software code, such as a software service, defined in a declarative language. For example, the processing widget defines the operations that are performed and parameters of the operations of the software code. The declarative language, for example, may be JAVASCRIPT object notation (JSON). However, other declarative languages may be used without departing from the scope of the claims.

In one or more embodiments, the processing widget (112) is defined as a set of states of the software code, whereby each state corresponds to an individual definition in the software code. Each state has a set of operations and one or more state transitions. The operations specify the instructions to execute when the processing system is executed. The state transition specifies a condition to transition to a next state. One or more of the states may be start states, or entry states, and one or more of the states may be end states. The entry states are states that start the execution of the processing widget. The end states are states that end the execution of the processing widget.

Processing widgets may inherit from other processing widgets. Through inheritance, the processing widget may add additional states from the other processing widgets.

The development user interface (106) includes a graph interface (114), a textual interface (116), and a grammar (118). The graph interface (114) interfaces with a developer using drag and drop functionality. A developer may specify locations of nodes and edges connecting the nodes. Each node corresponds to a state of the set of states of the processing widget. The edges correspond to state transitions between the states. Nodes are represented as a shape, such as a circle, in the graph interface (114). When the user selects a node or edge, the user may add the attributes of the state or state transition. The textual interface (116) is configured to interface with the developer based on text. The textual interface (116) receives the textual version of the processing widget (112).

Through the development user interface (106), the developer creates a graph for widget by adding nodes, then adding state to nodes, and then adding lifecycle information in the form of operations to the nodes and adding network calls. The developer draws the graph with the graph interface (114) and then fills in the attributes with the textual interface (116).

The development user interface (106) also includes a grammar (118). The grammar specifies the expected attributes and attribute values of the processing widget. The grammar (118) specifies how to define navigation between states in a processing widget, network calls, logging, beaconing (e.g., for real time monitoring), failed customer interaction (FCI) and real-time user monitoring (RUM) for customer interaction. An example grammar is specified in FIGS. 15A-15H.

A testing system (120) is connected the development user interface (106). The testing system (120) is configured to perform at least two layers of testing. In a first layer, the testing system (120) confirms that the processing widget (112) complies with the grammar. In the second layer, the testing system (120) confirms that the processing widget can execute on the computing system of the particular platform type.

Figure 2:
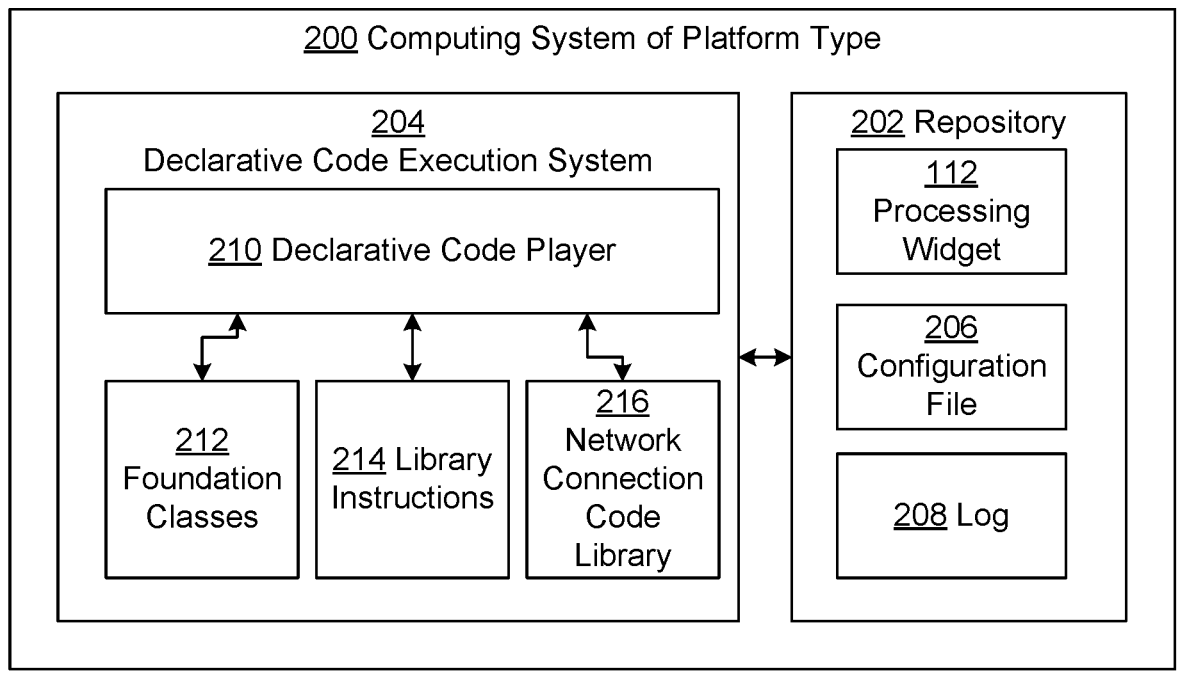
FIG. 2 shows a schematic diagram of an execution system in accordance with one or more embodiments.

FIG. 2 shows the execution environment of a processing widget (112) in accordance with one or more embodiments. The execution environment is the computing system of a particular platform type (200) that includes a repository (202) and a declarative code execution system (204). The repository (202) includes functionality to store the processing widget (112), configuration file (206), and a log (208). The processing widget (112) is the same as the processing widget discussed above with reference to FIG. 1. The processing widget is generic across platform types and is executable by each platform type. The configuration file (206) stores configuration information for a particular instance of the processing widget. For example, the configuration information may be user information, server information or other configuration information. The log (208) is a set of event records of events from executing the processing widget.

The declarative code execution system (204) is software that is configured to execute the processing widget. The declarative code execution system (204) includes a declarative code player (210) connected to foundation classes (212), library instructions (214), and network connection code library (216). The declarative code player (210) is software compiled and executable on the particular platform type. Thus, the declarative code player (210) is specific to a platform type and generic to processing widgets. The declarative code player (210) is configured to iterate through the states of the processing widget starting with a start state and following the state transitions. The declarative code player (210) is configured to perform the operations of each state.

The declarative code player (210) uses the foundation classes (212), library instructions (214), and network connection code library (216). The foundation classes (212), library instructions (214), and network connection code library (216) are software code that is specific to the platform type. The foundation classes are commonly used routines. For example, the foundation classes may describe window creation and other graphical user interface (GUI) elements, file input/output operations, multithreading, and other tasks. The library instructions (214) are the set of instructions that are defined for each possible operation of the grammar Each operation in the processing widget maps to a set of library instructions. Namely, the library instructions are the software instructions that perform the operations specified in the states. The network connection code library (216) is software code that is configured to perform network calls.

In the system shown in FIGS. 1 and 2, the developer can declare software through a human readable interface using and making declarations as the processing widget. Multiple releases may be created for different editions of the processing widget, whereby each edition is for a different subset of users and are operable on a variety of platform types.

FIGS. 3-8 show flowcharts in accordance with one or more embodiments. While the various steps in these flowcharts are presented and described sequentially, at least some of the steps may be executed in different orders, may be combined, or omitted, and at least some of the steps may be executed in parallel. Furthermore, the steps may be performed actively or passively.

Figure 3:
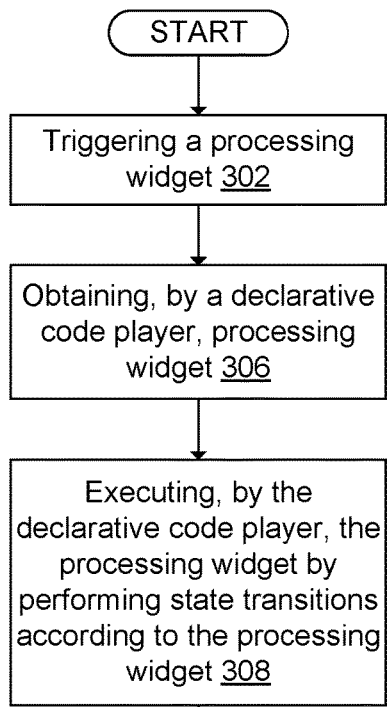
FIGS. 3 and 4 show flowcharts in accordance with one or more embodiments.
Figure 4:
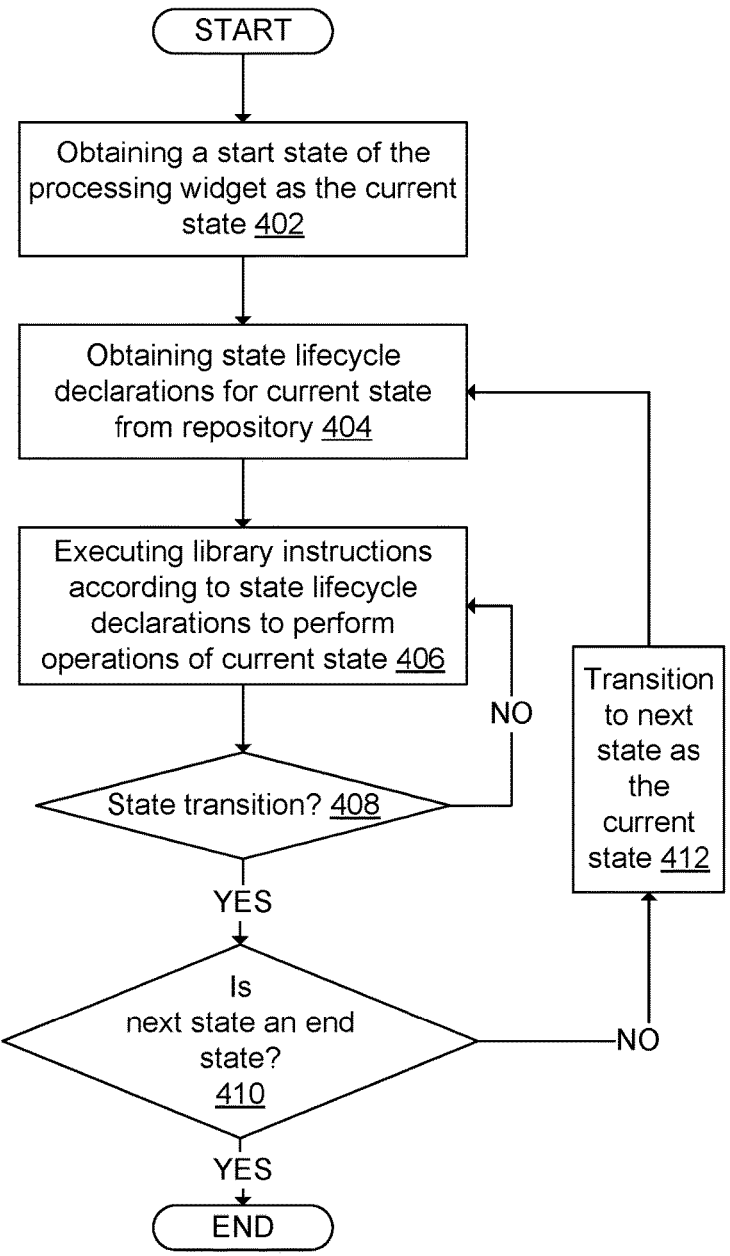

FIGS. 3 and 4 show flowcharts for executing a processing widget in accordance with one or more embodiments. Turning to FIG. 3, in block 302, the processing widget is triggered. During execution of an application, the declarative code player executing on a computer processor receives a request to initiate a process defined by the processing widget. In response, at Block 306, the declarative code player obtains the processing widget. The declarative code player obtains the processing widget from the repository. If the processing widget is not local, then the declarative code player may obtain the processing widget from remote storage and then store the processing widget in cache.

The request may include properties defining the start state in the processing widget. After obtaining the processing widget, the declarative code player matches the properties in the request to a start state of the processing widget. The declarative code player initiates execution of the processing widget at the corresponding start state.

In Block 308, the declarative code player executes the processing widget by performing state transitions according to the processing widget. Executing the processing widget is described in FIG. 4. The processing of FIG. 4 is performed by the declarative code player executing on a computer processor using the foundation classes, library instructions, and network connection code library.

Turning to FIG. 4, in Block 402, a start state of the processing widget is obtained as the current state. As discussed above, the start state is determined by matching the start state to the request. The start state corresponds to an entry point of the processing widget.

In Block 404, the state lifecycle declarations for the current state are obtained from the repository. The state lifecycle declarations are the definitions defined for the state that includes the list of operations to perform for the state.

In Block 406, library instructions are executed according to the state lifecycle declarations to perform the operations of the current state. For each state lifecycle declaration, the declarative code player identifies the operation and parameters of the operation from the definition in the widget to identify the corresponding library instructions to execute. The declarative code player transfers execution to the corresponding library instructions with the parameters. The library instructions execute. When execution completes, the declarative code player determines whether a state transition occurs (408). A state transition occurs when the state of execution has attribute value(s) matching a state transition connected to the current state. If no state transition is to be performed, the flow continues with Block 406 to processes the next state lifecycle declaration.

If a state transition is to be performed, the determination is made whether the next state is an end state in Block 410. If the next state is an end state, the processing completes. If the next state is not an end state, the declarative code player transitions to the next state as the current state in Block 412. Transitioning to the next state includes following the state transition to the next state.

The following figures provide example implementations in accordance with one or more embodiments. FIGS. 5, 6, 7, and 8 show example flowcharts in accordance with one or more embodiments.

Turning to FIG. 5, FIG. 5 shows an example flowchart for building and deploying a processing widget in accordance with one or more embodiments. In FIG. 5 and FIG. 6A "creating" includes generating a new item, modifying an existing item, and generating from a preexisting item.

Initially, a demo application configuration may be created. The test application may allow developers to create a so-called declarative widget. The demo app configuration definitions provide information about various test environments such as production, pre-production, quality, and performance. It also provides the configurations for the mock environment which allows the widget to be tested in pre-set conditions. For example, to test the widget X, the demo application configuration may help the developer to initialize the new widget X and allow them to test the widget.

In Block 504, a declarative widget configuration is created. Declarative Widget is a small component of software applications, which can be represented as a node of a graph. A node in the declarative widget is a state that can have a user experience or may be just a business logic. A declarative is defined by a set of configurations that is written as per the grammar shown in FIGS. 15A-15H.

FIG. 6A shows a flow diagram for creating widget declarations in accordance with one or more embodiments. The process starts with configuration for the state manager which is a State Machine in the example. As declarative widget is a kind of graph, State Manager declaration is a representation of the graph. State Manager declarations provide the information such as state managers identifier, name, list of possible entry events and the corresponding or associated state. State manager provides information on possible end states and a forced end state identifier. End State can be interpreted as leaf nodes in the graph. Forced End State is the leaf node which the state Machine/state Manger can go to even if there is no transition defined. State Manager Declaration also provides a list of state definitions.

Figure 6B:
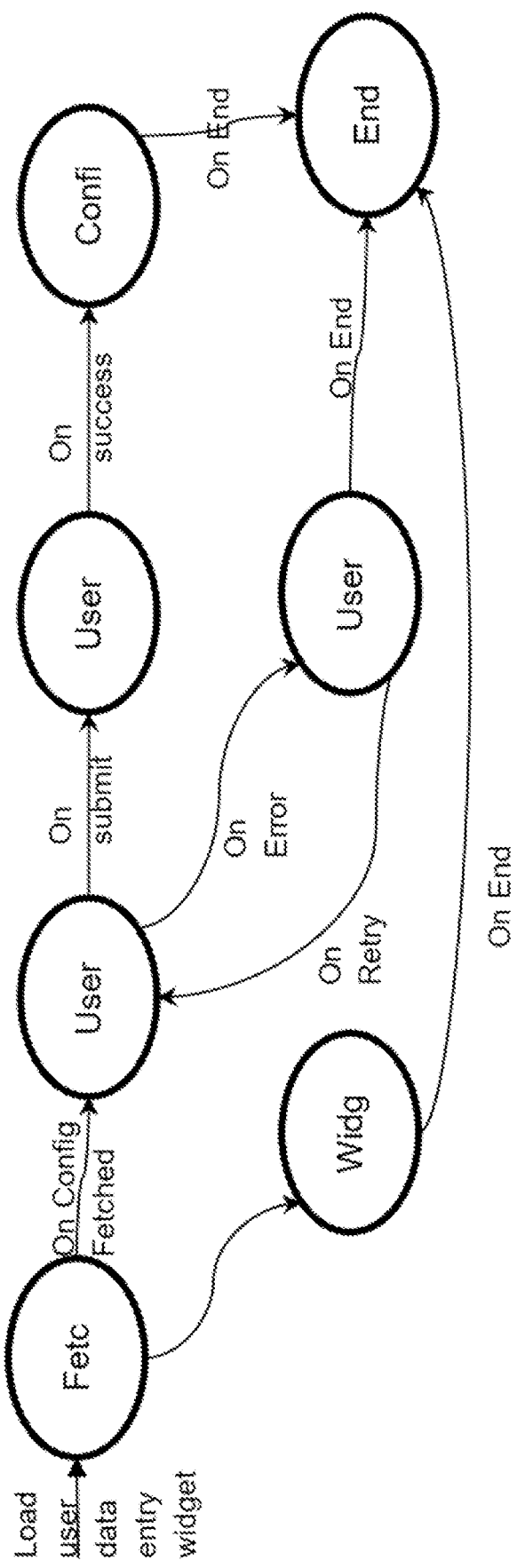

By way of an example, consider the scenario in which the declarative widget is used by user to accept some user information. After validating the information, the declarative widget submits the data to a backend service. Based on the response or error, the declarative widget shows user confirmation or error screen and lets user retry if needed from the error screen. The example declarative widget as shown in the state machine diagram is represented in FIG. 6B.

In Block 602, state manager declarations of the processing widget are created. The state manager declarations manage which state is the current state and the transition between the different states. The State Manager config file provides the information about all the states shown in FIG. 6B, list of entry events and corresponding state. For example, in the widget flow of FIG. 6B, "Load user data entry widget" is associated with "Fetch widget config State".

In Block 604, state transition declarations of the processing widget are created. In the example of FIG. 6B, transitions between one state to another state is defined as "events". In the example, transitions are read as on event "a" transition from state "x" to "y" or from state "x" goto "y". On event "a" is defined in a transition definition file. By way of a more specific example of FIG. 6B, from "Fetch Widget Config State" goto "User data input state" on event "on config fetched" is defined in the state machine.

In Block 606, widget data store declarations are created for each state of the processing widget. The data store is the in-memory structure that holds the data shared across, and this data store can be persisted in event of application backgrounding. The state may be restored when application is brought back to foreground.

In Block 608, state lifecycle declarations are created for each state of the processing widget. Each state has its own life cycle definition. The lifecycle definition may be written in separate files and provide information to the declarative widget runtime on how to initialize, or de-initialize the state, after initializing, on enter the life cycle event of the state is called, and before de-initializing, on exit the life cycle event of the state is called. On the initialize call, a state initializes the user interface, view models, data binders or any other initializations. The grammar defines how to initialize the user interface.

Based on the configuration of each state, a user interface can be created dynamically from the declarations or from native code on the respective platform.

In Block 610, dynamic screen declarations are created for each state of the processing widget. The dynamic screen declarations define the visual screens for the processing widget. In one or more embodiments, the dynamic screen declarations are dynamic in that the screen declarations are platform independent. The layout and content may change depending on screen size and screen type.

In Block 612, the metric profile declarations are created for the processing widget. The metric profile declarations define the type of metrics to track for the processing widget. Metrics Profile declaration is used to declare the telemetry information that will be send from the widget, which will be used to Monitor the behavior of the widgets using logs. The logs may be real time and these logs will be used to create alerts and dashboards. Measuring success or failure of the widget, by calculating the ratio of number of users going through the happy path flows or desired flows vs the number of users ending up in erroneous flows or flows with degraded experience using the performance logging to send customer interactions. Analytics beaconing is used to trace the user behavior by sending the view, click, etc. beacon.

In Block 614, the network call declarations are created. The network call declarations define how and when the computing device performs a network call to another computing device. For example, the network call may be a remote service request to another system. The network call declarations further define the parameters of the request to include in the network call. Widget may need to make remote network calls. The calls may be declared using Network Calls definition. These definitions are used to initialize the generic network call library that will internally perform the network calls.

In Block 616, model declarations are created. Model definitions are used to transform the request, response, and query params to platform specific memory objects. These model definitions are referred to in the network call definitions.

Further, in Block 618, the processing widget is saved to the repository.

Returning to FIG. 5, in Block 506, the widget declarations of the processing widget are tested. Testing may include confirming that the processing widget complies with the grammar, checking for infinite loops, and performing other processing. Specifically, testing confirms that the widget complies with the grammar.

In Block 508, the processing widget is published. The processing widget is stored in the repository and may be transmitted to various computing systems.

In Block 510, the configuration file for the processing widget is generated. This artifact configuration generates declarative widgets to consume and pull the declarations as per the configurations. The configuration files are added to the widget repository in Block 512, and platform specific code is added to pull the latest and specific versions of the configurations.

In Block 514, the platform code is added. The platform code is code for the declarative code execution system. The platform code is specific to the particular platform type.

In Block 516, the processing widget is built on the platform type, and tested in Block 518. Testing the processing widget on the platform type confirms that the processing widget performs as expected on the particular platform. The processing widget may be tested on the same computing system or a different computing system than the computing system on which it is executed.

If the processing system executes on a different computing system, in Block 520, the processing widget is deployed on the computing system. Deploying the processing widget to the computing system includes releasing the processing widget as artifacts, pod, or package on the platform to the artifact repository. The artifacts can be consumed by applications as dependency. The desired features provided by the widget are integrated into other applications by using the widget.

Figure 7:
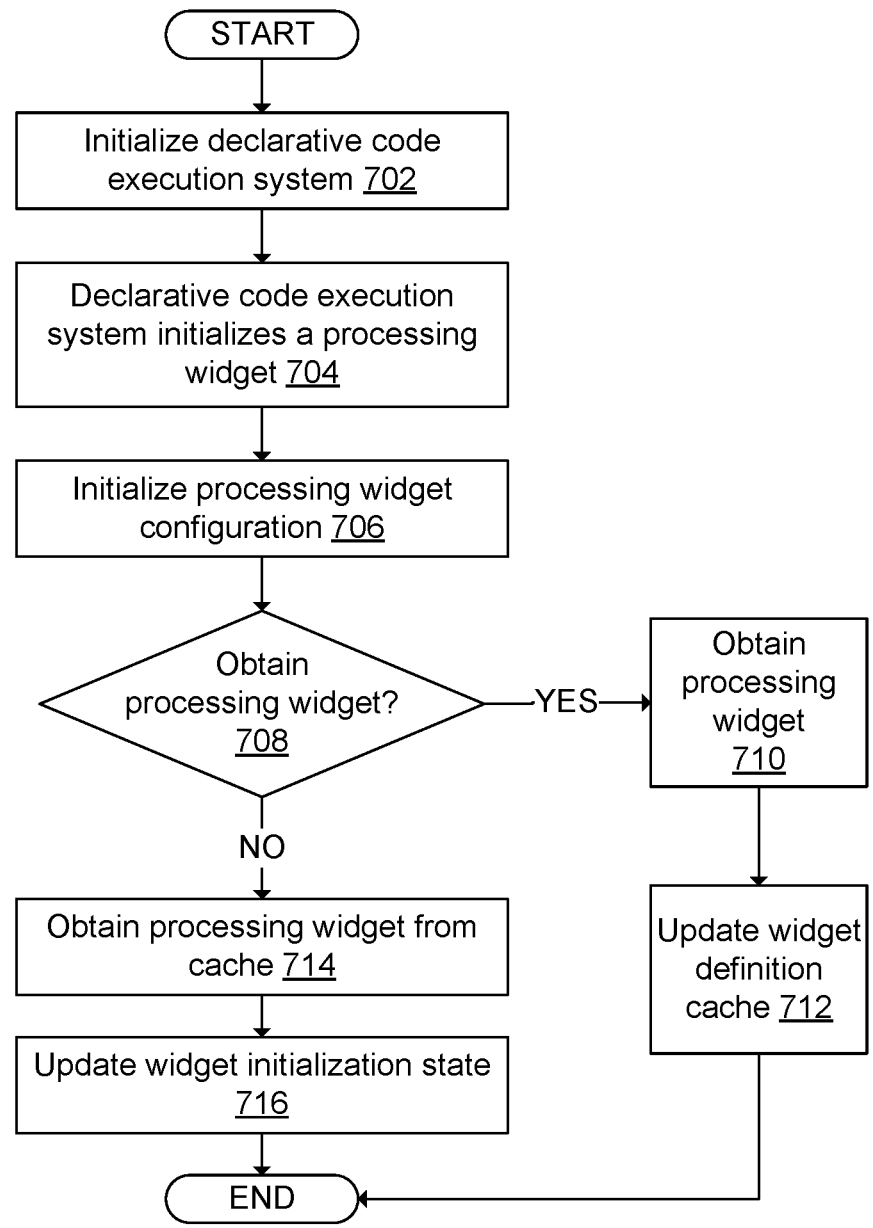
FIGS. 7 and 8 show flowcharts in accordance with one or more embodiments.

FIG. 7 shows a flowchart for executing the processing widget in accordance with one or more embodiments. In Block 702, the declarative code execution system is initialized. When the declarative code player is initialized, one or more of the processing widgets may be initialized. In Block 704, the declarative code execution system initializes execution of the processing widget. In Block 706, the processing widget configuration is initialized. In Block 708, a determination is made whether to obtain the widget definition for the processing widget. Specifically, a determination is made whether to obtain the processing widget from a remote storage. In Block 710, the processing widget is obtained, and the cache is updated in Block 712. The processing widget may then be executed.

Returning to Block 708, if the processing widget is locally stored in cache, the processing widget is obtained from cache in Block 714. In Block 716, the widget initialization state is updated based on loading the processing widget. Loading the processing widget is further described in FIG. 8.

Figure 8:
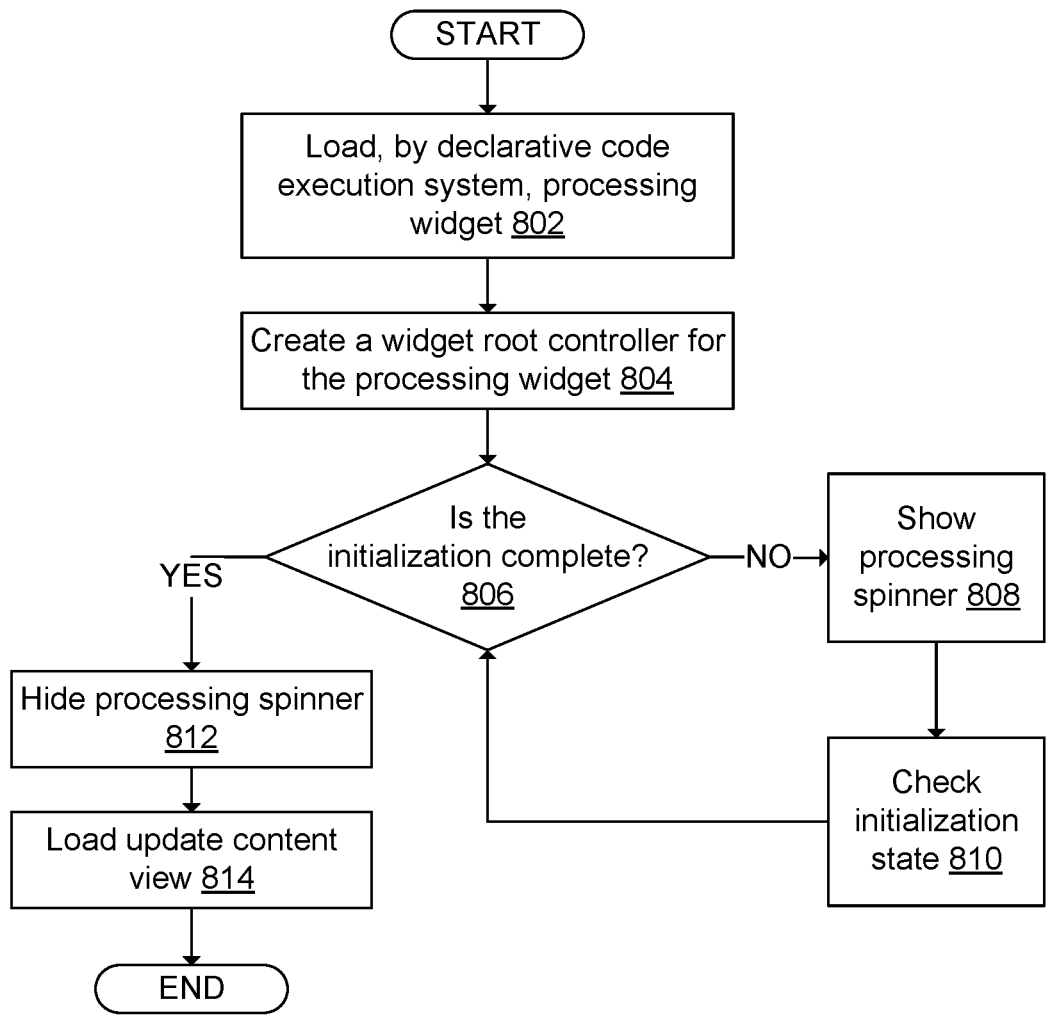

FIG. 8 shows a flowchart for executing the processing widget in accordance with one or more embodiments. In Block 802, the declarative code execution system loads the processing widget. In Block 804, the widget root controller is created for the processing widget. A determination is made whether the initialization is complete. If the initialization is not complete, then a processing spinner may be shown in a user interface of the declarative code player in Block 808. The initialization state is checked in Block 810. When initialization is determined complete in Block 806, the flow proceeds to Block 812 to hide the processing widget. Further, an update content view is loaded in Block 814. The declarative code player executes the processing widget as described above.

Figure 9:
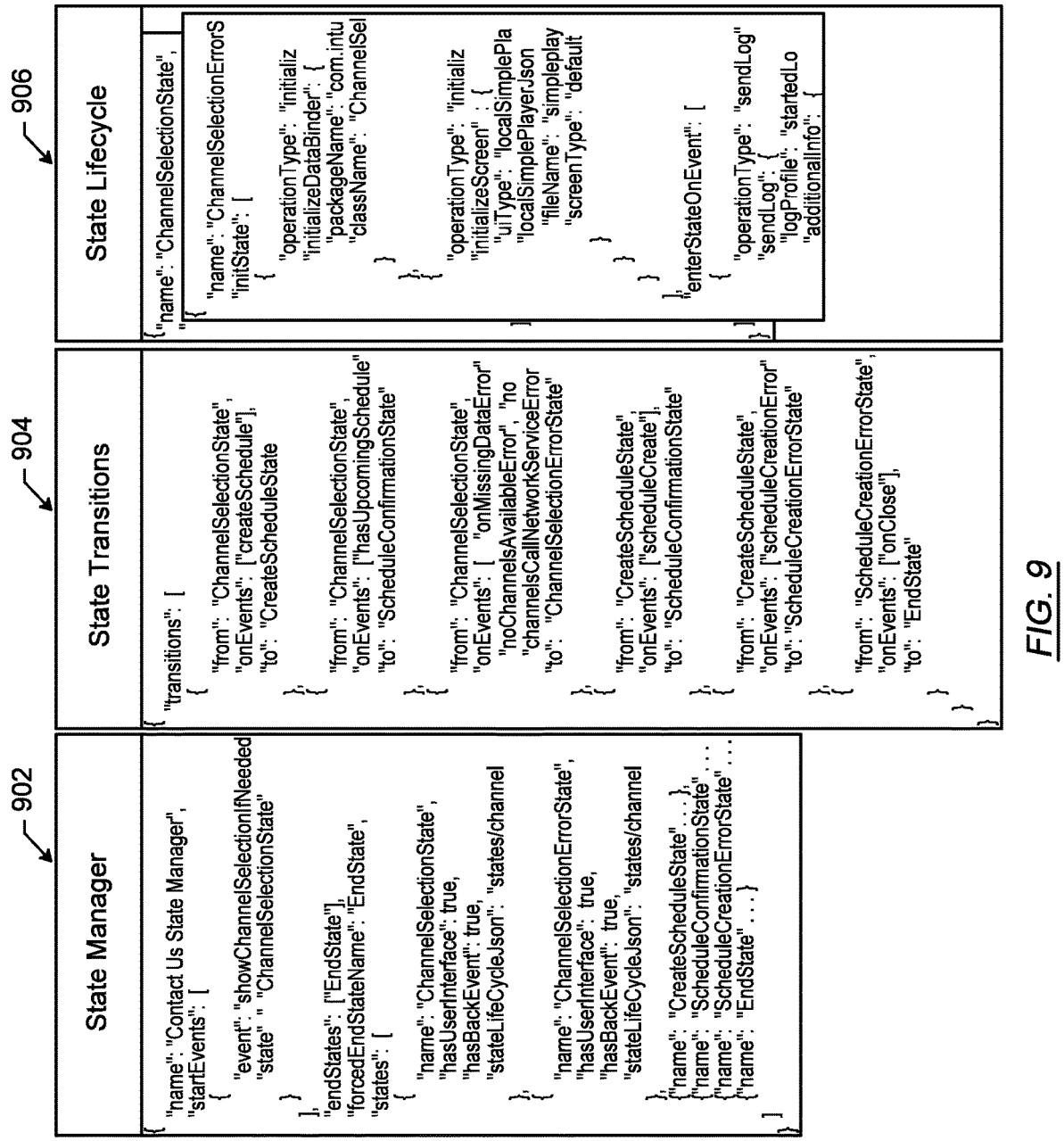

FIGS. 9, 10, 11, 12, 13, 14, 15A-H, 16, 17, 18, 19, 20, and 21 show examples in accordance with one or more embodiments. FIG. 9 and FIG. 10 show example processing widget in accordance with one or more embodiments. In the example of FIGS. 9 and 10, the processing widget is defined in JSON format. The values in quotes correspond to the attribute names. The values on the right of the colon correspond to the attribute values. FIG. 9 shows the definitions for the state manager (902), the state transitions (904), and the state lifecycles (906). The state manager (902) lists the start events that trigger the processing widget, and the corresponding start state, the end state, and the intermediate states. The state transitions (904) list the from state that the transition is from, the to state that the transition is to, and the triggering event for the transition. The state lifecycle (906) specifies the operation to perform, the package and class name of the operation, the operation type, input streams, the binder, and other information for executing the state.

FIG. 10 shows the definitions for screens (1002) listing information to display on the screens, network calls (1004) specifying parameters of the network call, and display, and models (1006).

Figure 11:
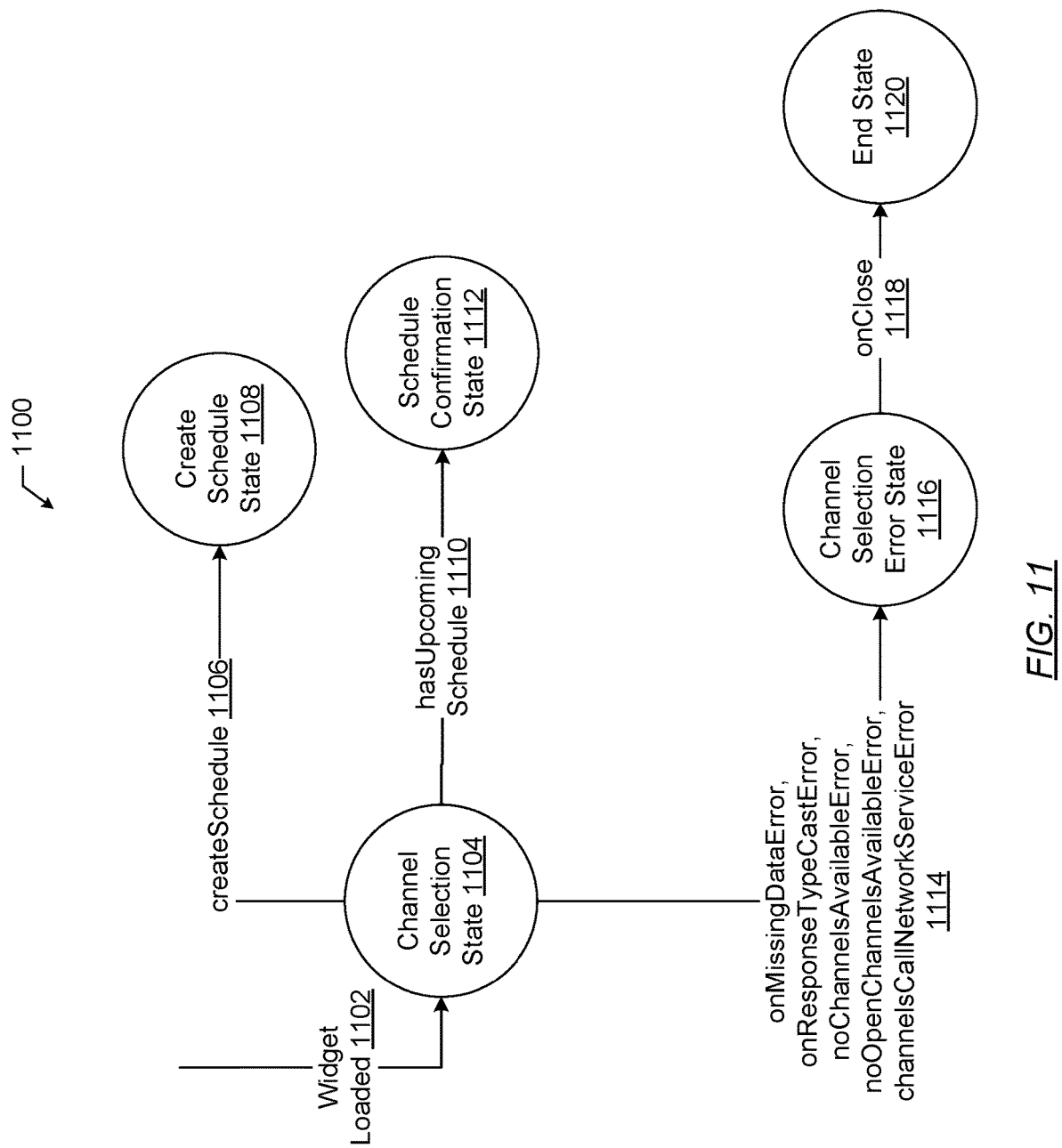

FIG. 11 shows an example of a graph (1100) of the states of an example processing widget. The loading of the widget (1102) causes start of the start state (i.e., channel selection state (1104)). A create schedule event (1106) transitions to a create schedule state (1108), a has an upcoming schedule detected event (1110) transitions to a schedule confirmation state (1112) to confirm the schedule. Various error events (1114) transitions to the channel selection error state (1116), which onClose (1118) transitions to the end state (1120). Other states and transitions may occur in the graph. FIG. 12 is a tabular view of the graph of FIG. 12. The graph of FIG. 11 may be displayed in and manipulated by a developer in a graph interface. The tabular view may be displayed and manipulated in the textual interface.

Figure 13:
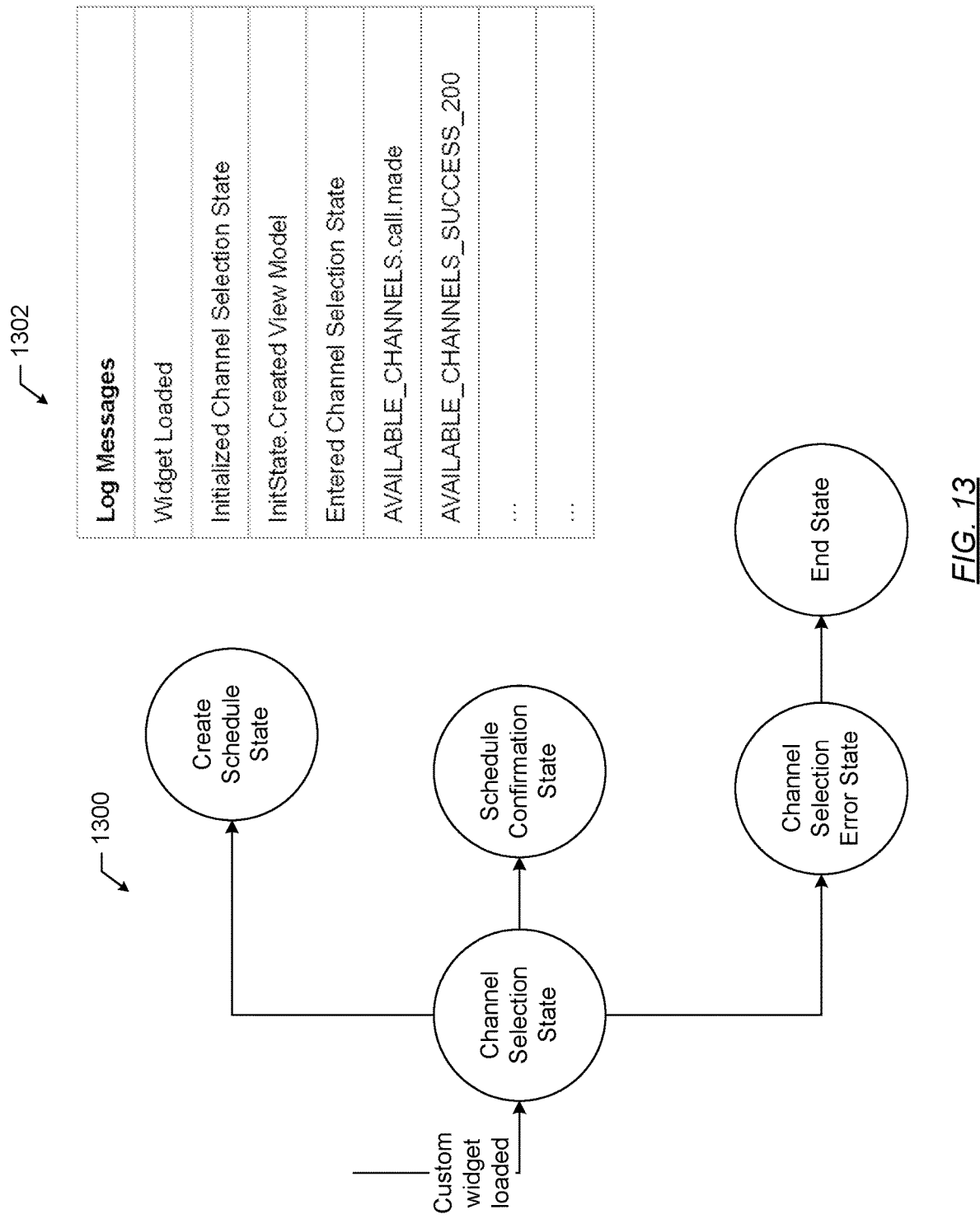

FIG. 13 shows a diagram of the graph (1300) of FIG. 11 and the logged messages (1302) that may be displayed when executing the processing widget defined in FIG. 11. The logged messages (1302) list the states in the order of processing and the transitioning between states.

FIG. 14 shows an example table (1400) of FCI and beaconing. Because transitioning between states can be specific as to the path through the user control, a developer using embodiments may diagnose a problem and identify an error.

FIGS. 15A, 15B, 15C, 15D, 15E, 15F, 15G, and 15H show an example of a grammar for the declarative code. The grammar identifies the classes, attribute names of attributes of each class, and attribute value types for each class. FIG. 15A shows the grammar for a widget definition (1502). FIG. 15B shows the grammar for a state manager (1504). FIG. 15C shows the grammar for a state (1506). FIG. 15D shows the grammar for a state lifecycle (1508). FIG. 15E shows the grammar for transitions (1510). FIG. 15F shows the grammar for a network calls (1512). FIG. 15G shows the grammar for model definitions (1522). FIG. 15H shows the grammar for metrics profile definitions (1524). In some embodiments, a one to one mapping exists between the widget definition (1502) and the state manager (1504). The state manager (1504) may be in a one to many mapping with state definitions (1506) and start and stop event definitions.

The models definition (1520) is connected to model definition (1522), which have reflection model and declaration (1526). The declaration is connected to members (1528).

Figure 16:
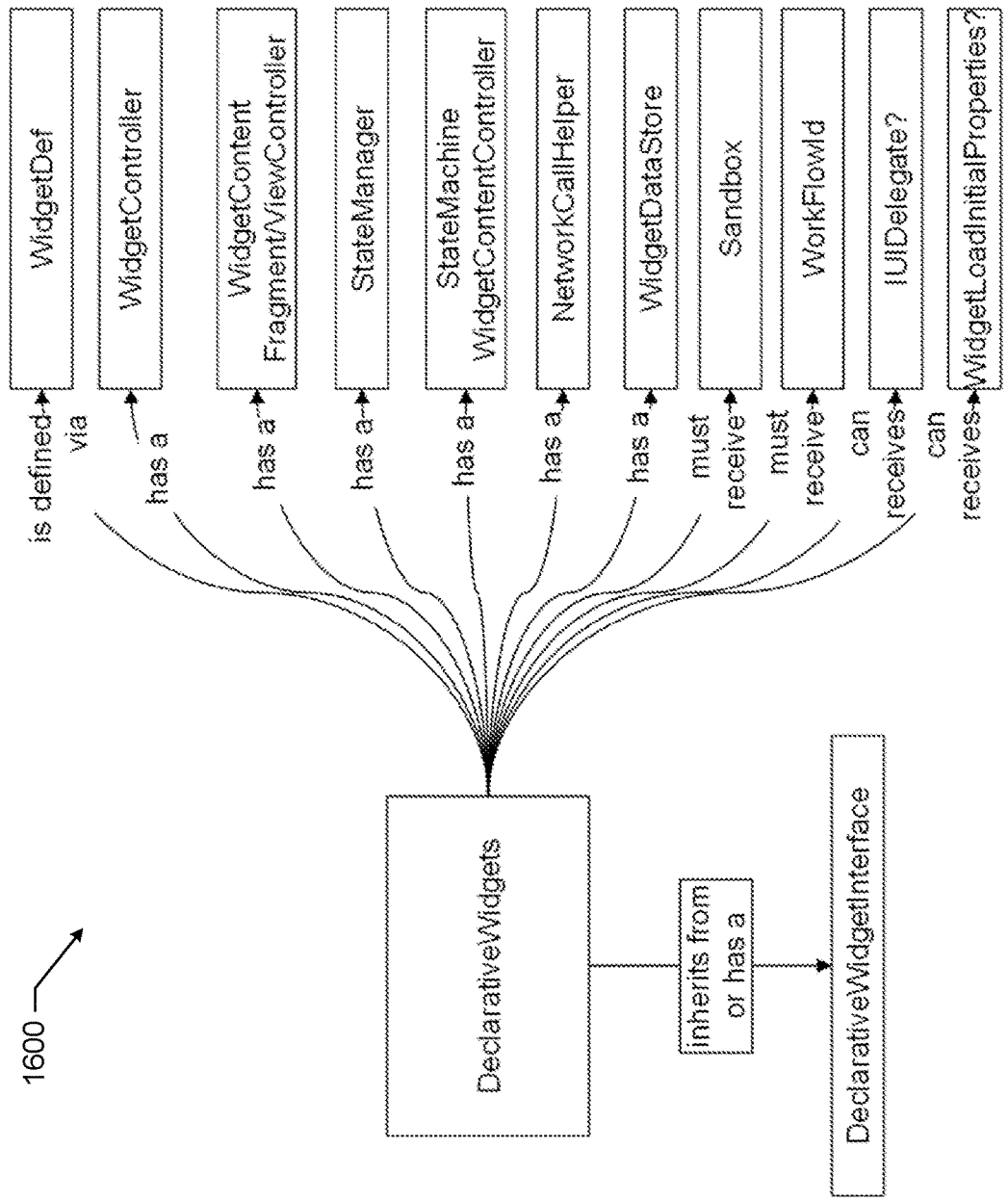

FIG. 16 shows an example of a declarative code player (1600). The declarative widget is an example of a declarative code player for executing a processing widget. The declarative widget is a small library coded in multiple operating system types. The programming language used for the declarative widget is dependent on the operating system type. The boxes on the right side of FIG. 16 show the attributes that are defined within the processing widget and used by the declarative code player to execute the processing widget. The widget controller performs the user interface. The sandbox allows for protected performance of various operations. Each processing widget has a workflow identifier. The UI delegate delegates the user interface to communicate back to a controlling application.

Figure 17:
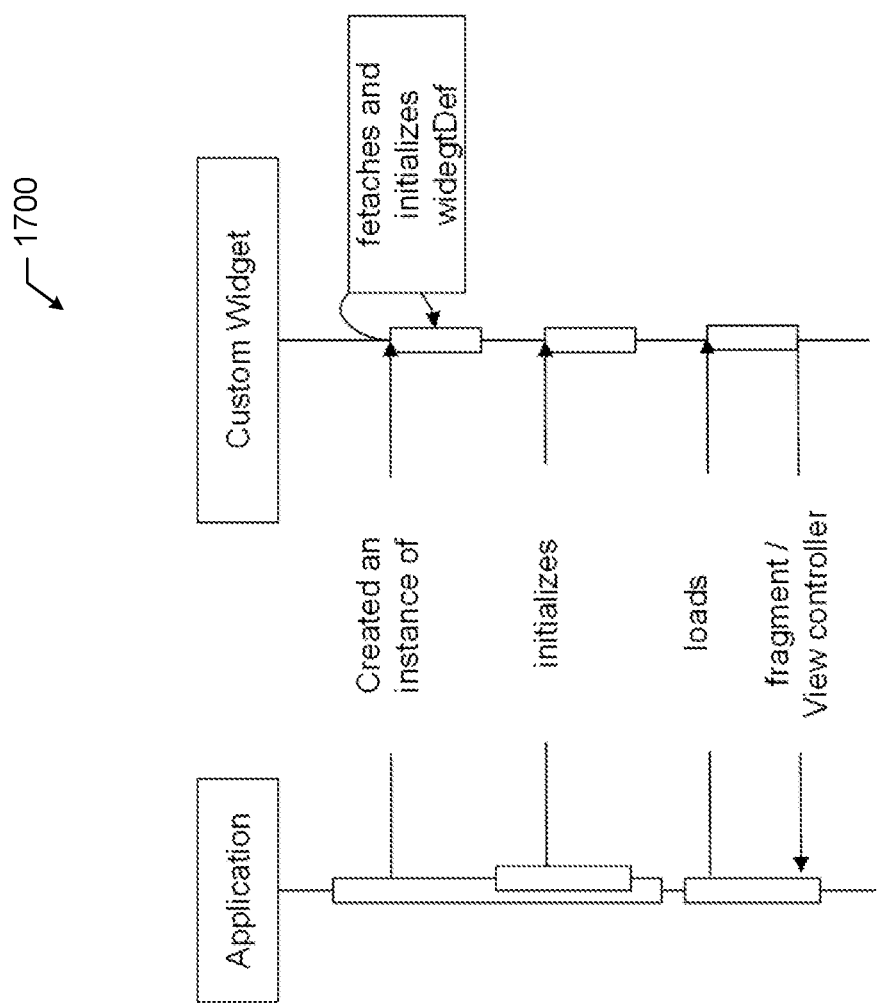

FIG. 17 shows an example flow diagram (1700) for execution in accordance with one or more embodiment. An application, such as the declarative code player creates an instance of a custom widget, processing widget. The application initializes the processing widget and loads the processing widget. The application instance further performs fragment and view controlling for the processing widget.

Figure 18:
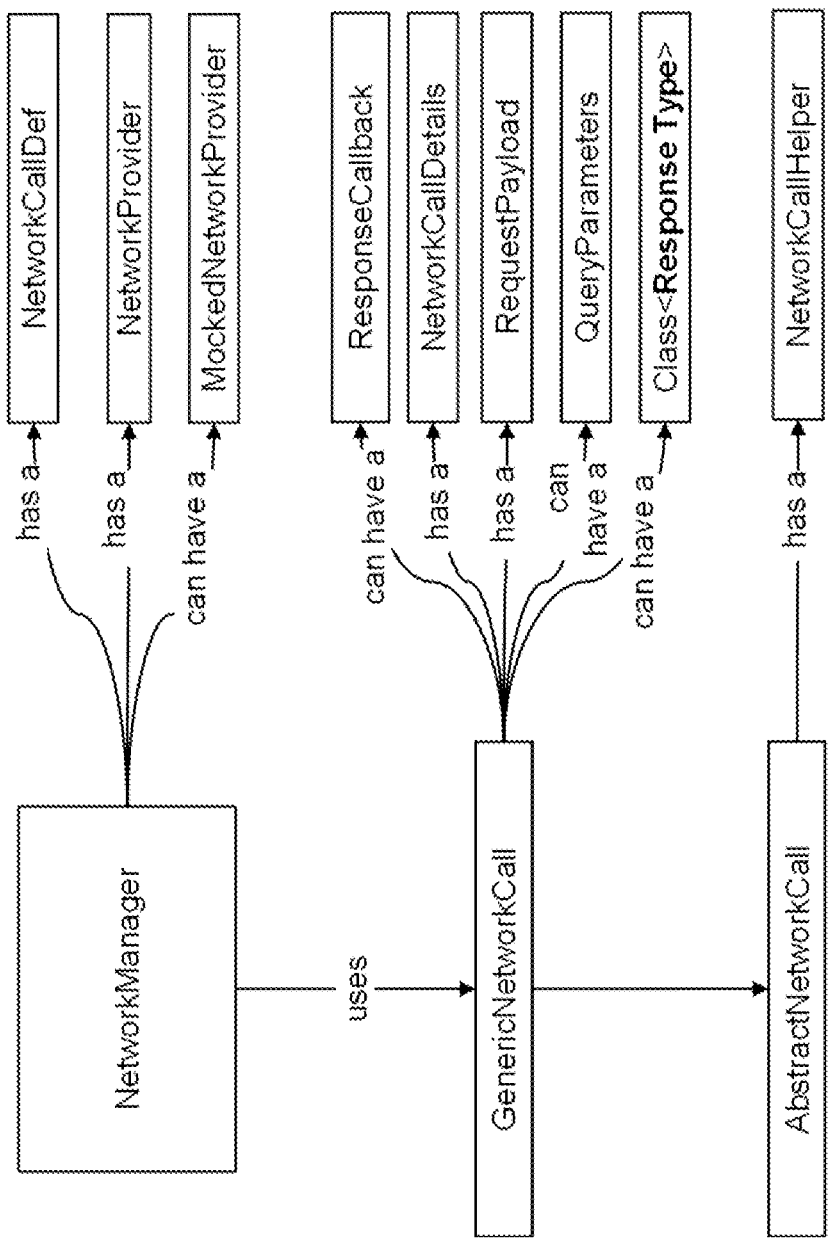

FIG. 18 shows a diagram of a generic network call library (1800). The network call library defines how a network call is performed. Each of the boxes on the right side of FIG. 18 show the parts of the network call that are defined in the processing widget. Namely, each of the boxes on the right side specify the attributes defined in the processing widget that are used by the network call library.

Figure 19:
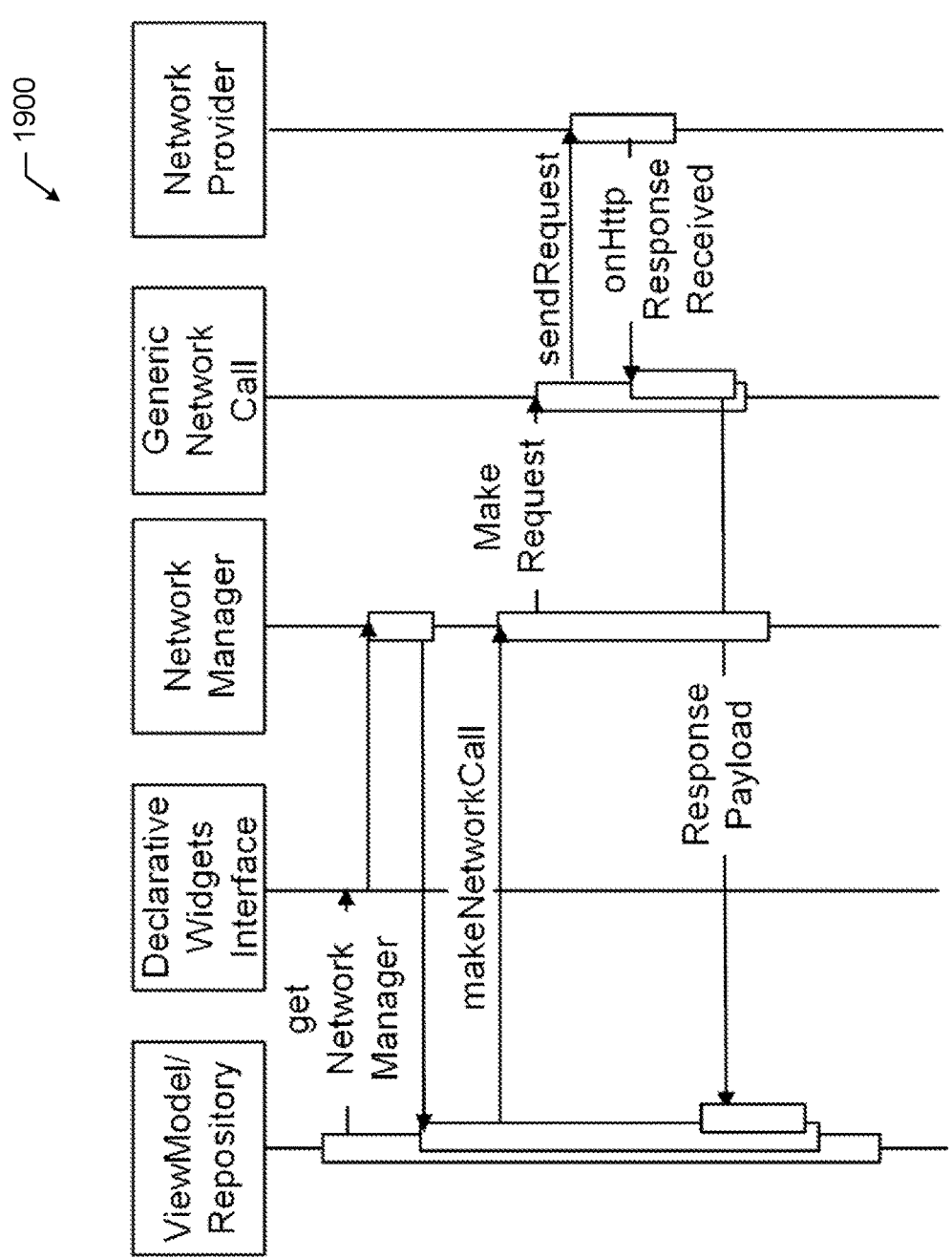

FIG. 19 shows a diagram (1900) of performing a network call. A view model repository sends a get network manager request to the declarative widget interface. The declarative widget interface sends a request to the network manager that responds to the view/model repository. The view/model repository issues a make network call request to make a request to a generic network call. The generic network call sends the request to the network provider, which responds with an HTTP response. The response payload is transmitted to the view/model repository.

Figure 20:
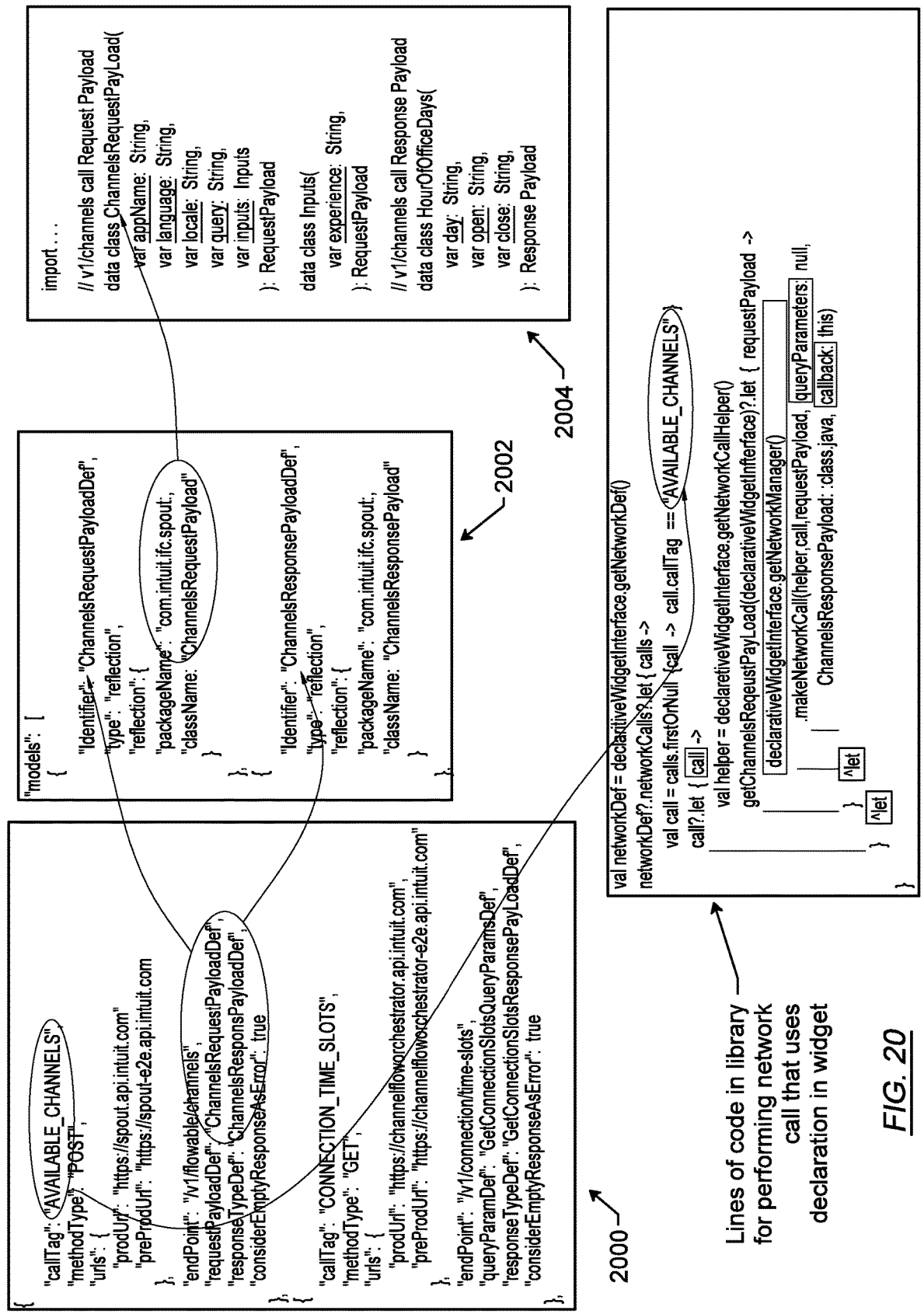

FIG. 20 shows an example of how different portions of a processing widget are used to perform a network call. The processing widget is the information in boxes (2000, 2002, and 2004). As shown, the processing widget does not include code for the network call. Rather, the processing widget is a set of definitions. The network call library (2006) has the code that performs the network call using the definitions in the processing widget (2000, 2004, 2006). The lines between the boxes represent how different parts of the boxes map to different parts of the processing widget.

FIG. 21 shows an example of generic logging capability for error correction. Table (2100) lists the defined error types. Table (2102) provides the list of additional information that may be in the log. Table (2104) provides success and failure attributes.

One or more embodiments provide a dynamic behavior with navigation flow, screens of the processing widget that are displayed, and network calls. Further, the declarative models and generic binding are easily modifiable. Further, one or more embodiments allow for self-healing through invalidating cache definitions in the case of an exception, service API contract breakage, client error, or other errors. The development user interface provides an easy mechanism to deploy new processing widgets that has a smaller learning curve for development. Further, platform independent development may be performed.

Figure 22A:
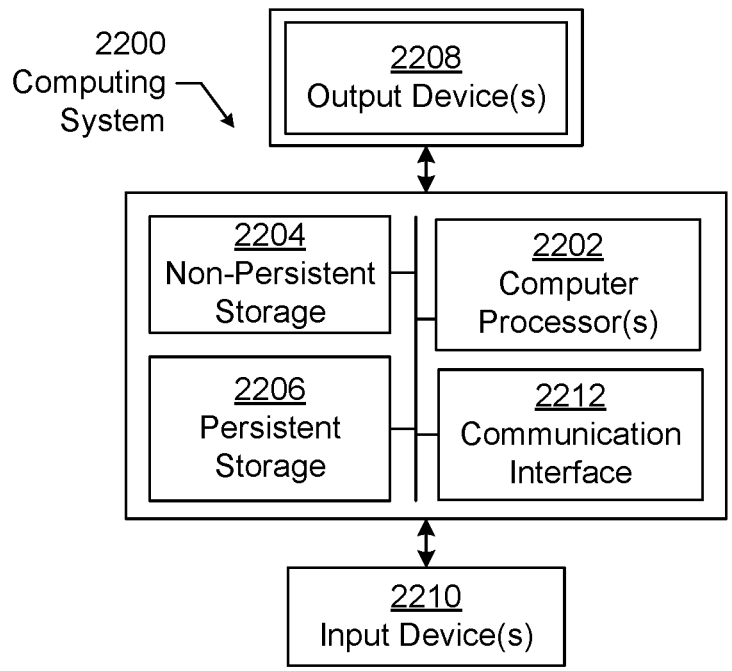
FIGS. 22A and 22B show a computing system in accordance with one or more embodiments of the invention.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 22A, the computing system (2200) may include one or more computer processors (2202), non-persistent storage (2204), persistent storage (2206), a communication interface (2212) (e.g., Bluetooth interface, infrared interface, network interface, optical interface, etc.), and numerous other elements and functionalities that implement the features and elements of the disclosure. The computer processor(s) (2202) may be an integrated circuit for processing instructions. For example, the computer processor(s) may be one or more cores or micro-cores of a processor. The input devices (2210) may include a touchscreen, keyboard, mouse, microphone, touchpad, electronic pen, or any other type of input device. The communication interface (2212) may include an integrated circuit for connecting the computing system (2200) to a network (not shown) (e.g., a local area network (LAN), a wide area network (WAN) such as the Internet, mobile network, or any other type of network) and/or to another device, such as another computing device.

Further, the output devices (2208) may include a display device, a printer, external storage, or any other output device. One or more of the output devices may be the same or different from the input device(s). The input and output device(s) may be locally or remotely connected to the computer processor(s) (2202). Many different types of computing systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 22B:
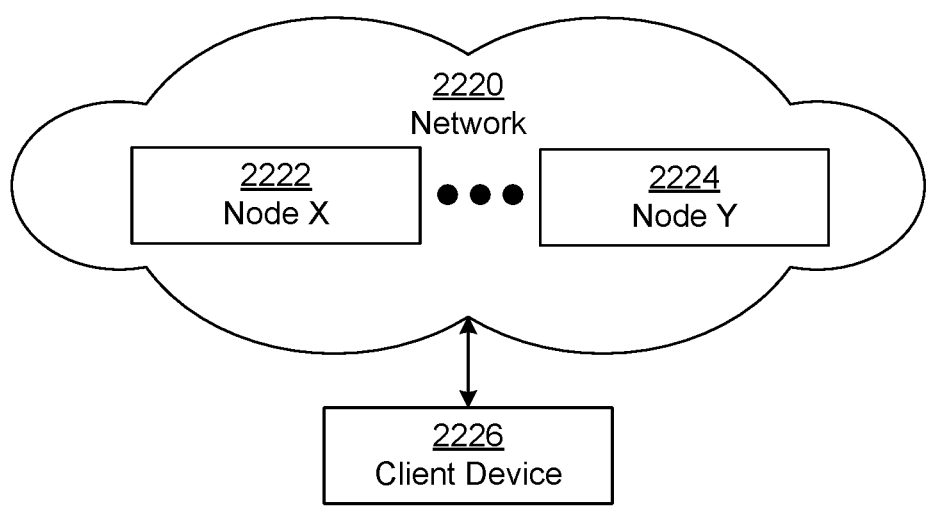

The computing system (2200) in FIG. 22A may be connected to or be a part of a network. For example, as shown in FIG. 22B, the network (2220) may include multiple nodes (e.g., node X (2222), node Y (2224)). Each node may correspond to a computing system, such as the computing system shown in FIG. 22A, or a group of nodes combined may correspond to the computing system shown in FIG. 22A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (2200) may be located at a remote location and connected to the other elements over a network.

The nodes (e.g., node X (2222), node Y (2224)) in the network (2220) may be configured to provide services for a client device (2226), including receiving requests and transmitting responses to the client device (2226). For example, the nodes may be part of a cloud computing system. The client device (2226) may be a computing system, such as the computing system shown in FIG. 22A. Further, the client device (2226) may include and/or perform all or a portion of one or more embodiments of the invention.

The computing system of FIG. 22A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user.

Furthermore, the GUI may present data directly to the user, e.g., data presented as actual data values through text, or rendered by the computing device into a visual representation of the data, such as through visualizing a data model.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

In the above description, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. Further, other embodiments not explicitly described above can be devised which do not depart from the scope of the invention as disclosed herein. Accordingly, the scope of the invention should be limited only by the attached claims.

What is claimed is:

1. A method comprising:
   initializing a declarative code execution system comprising a declarative code player;
   obtaining, by a computing system executing the declarative code player, a processing widget defining a plurality of states;
   initializing, by the declarative code execution system, the processing widget obtaining a widget definition of the processing widget from cache;
   updating a widget initialization state; and
   executing, by the computing system executing the declarative code player, the processing widget, wherein executing the processing widget comprises, for each current state of at least a subset of the plurality of states:
   obtaining a plurality of state lifecycle declaration for the current state from a repository, the state lifecycle declaration is specified as declarative content,
   executing a plurality of library instructions according to the plurality of state lifecycle declaration to perform at least one operation of the current state, and
   transitioning, as defined by the current state, to a next state as defined in the processing widget.

2. The method of claim 1, wherein at least one of the plurality of states comprises a network call operation.

3. The method of claim 1, wherein:
   the declarative code player is a first declarative code player defined for a first platform type of a plurality of platform types,
   the plurality of library instructions is a first plurality of library instructions specific the first platform type,
   the processing widget is generic to the plurality of platform types, and
   the method further comprises executing the processing widget by a second declarative code player for a second platform type of the plurality of platform types using second plurality of library instructions specific to the second platform type.

4. A method comprising:

obtaining, by a computing system executing a declarative code player, a processing widget defining a plurality of states;

creating a widget root controller for the processing widget;

checking an initialization state of the processing widget; and executing, by the computing system executing the declarative code player, the processing widget, wherein executing the processing widget comprises, for each current state of at least a subset of the plurality of states:

obtaining a plurality of state lifecycle declaration for the current state from a repository, the state lifecycle declaration is specified as declarative content, executing a plurality of library instructions according to the plurality of state lifecycle declaration to perform at least one operation of the current state, and transitioning, as defined by the current state, to a next state as defined in the processing widget.

5. The method of claim 1, further comprising:

tracking the current state of the plurality of states by a state manager defined in the processing widget.

6. The method of claim 1, further comprising:

tracking, during execution of the processing widget, a plurality of metrics in a log declaratively defined in the processing widget.

7. The method of claim 1, further comprising:

presenting a screen as dynamically defined in the processing widget.

8. The method of claim 1, further comprising:

executing the processing widget in a sandbox.

9. A system comprising:

a repository storing a processing widget defining a plurality of states, wherein the processing widget is generic to a plurality of platform types; and a computer processor executing a declarative code player, the declarative code player executing the processing widget, wherein the declarative code player is a first declarative code player defined for a first platform type of the plurality of platform types, and wherein executing the processing widget comprises, for each current state of at least a subset of the plurality of states:

obtaining a plurality of state lifecycle declaration for the current state from the repository, the state lifecycle declaration is specified as declarative content, executing a plurality of library instructions according to the plurality of state lifecycle declaration to perform at least one operation of the current state, wherein the plurality of library instructions is a first plurality of library instructions specific the first platform type, and transitioning, as defined by the current state, to a next state as defined in the processing widget, wherein the processing widget is executable by a second declarative code player for a second platform type of the plurality of platform types using second plurality of library instructions specific to the second platform type.

10. The system of claim 9, wherein the repository further stores a configuration file for the processing widget, wherein the configuration file stores configuration information for the processing widget.

11. The system of claim 9, wherein the repository further stores a log file, the log file storing log events defined in the processing widget while executing the processing widget.

12. The system of claim 9, further comprising:

a network connection code library for connecting via a network to a second computing system.

13. The system of claim 9, further comprising:

a testing system for testing the processing widget.

14. A method comprising:

presenting, in a graphical user interface, a graph interface to graphically define a plurality of states of a processing widget;

receiving, in the graph interface, a plurality of nodes connected by a plurality of edges, wherein each node of the plurality of nodes corresponds to a state of the plurality of states;

receiving, in the graphical user interface, a state lifecycle declaration for the state and a state transition definition for connecting the state to a subsequent state, wherein the state lifecycle declaration defines an operation of the state;

deploying the processing widget with a declarative code player, wherein the declarative code player executes a plurality of library instructions through the plurality of states;

receiving, in the graphical user interface, a plurality of metric profile declarations for the processing widget, the plurality of metric profile declarations defining a plurality of metrics to capture in the processing widget; and storing the plurality of metric profile declarations in the processing widget.

15. The method of claim 14, further comprising:

testing the processing widget.

16. The method of claim 14, receiving, in the graphical user interface, a state manager definition; and storing the state manager definition in the processing widget.

17. The method of claim 14, further comprising:

receiving a network call declaration; and storing the network call declaration in the processing widget.

* * * * *